March 28, 1961  J. E. GOLDRING  2,976,852
VALVE-IN-HEAD PNEUMATIC CYLINDER
Filed Sept. 21, 1959  3 Sheets-Sheet 1

INVENTOR.
JOHN E. GOLDRING
BY
Gardner + Zimmerman
ATTORNEYS

March 28, 1961 J. E. GOLDRING 2,976,852
VALVE-IN-HEAD PNEUMATIC CYLINDER
Filed Sept. 21, 1959 3 Sheets-Sheet 2

INVENTOR.
JOHN E. GOLDRING
BY
Gardner + Zimmerman
ATTORNEYS

March 28, 1961      J. E. GOLDRING      2,976,852
VALVE-IN-HEAD PNEUMATIC CYLINDER Filed Sept. 21, 1959      3 Sheets-Sheet 3

INVENTOR.
JOHN E. GOLDRING
BY
*Gardner + Zimmerman*
ATTORNEYS

United States Patent Office 2,976,852
Patented Mar. 28, 1961

2,976,852
VALVE-IN-HEAD PNEUMATIC CYLINDER

John E. Goldring, San Leandro, Calif., assignor to Modernair Corporation, San Leandro, Calif., a corporation of California Filed Sept. 21, 1959, Ser. No. 841,133

7 Claims. (Cl. 121—46.5)

The present invention relates to fluid operated cylinders of the class providing controlled reciprocating movement of a shaft and more particularly to a cylinder having a compact and versatile control valve forming an integral part thereof. While the invention will be herein described with reference to pneumatic cylinders in particular, it is to be understood that concepts and features of the invention are applicable to related forms of fluid driven equipment, such as, for example, hydraulic or steam systems.

Pneumatic cylinders are extensively used in diverse forms of machinery to accomplish the controlled movement of a part in either of two opposite directions. Briefly the mechanism comprises a cylindrical casing having an air port at each end and having a piston disposed within the casing for reciprocation therein. A shaft projects through a seal at one end of the casing and connects the piston with the external element which is to be driven. By admitting high pressure air to a selected end of the casing, and concurrently venting the opposite end, the piston is made to move in a selected direction and the external load is driven accordingly.

Thus it is necessary that a fairly complex control valve be provided to selectively switch the air flow between ends of the casing and to simultaneously vent the end of the casing toward which piston movement is to take place. Heretofore it has been the practice to utilize valves which are physically separate from the cylinders and which, owing to the designs employed, cannot be compactly formed with the cylinder as a unitary element thereof. In comparison with the present invention, however, the use of a control valve which is separate from the cylinder results in an undue degree of bulk, weight, and installation difficulty and requires the use of an unnecessary amount of high pressure hose or piping for the purpose of interconnecting the two elements.

In addition, the valves heretofore used with pneumatic cylinders have not been readily susceptible to changes in the method of actuation. It is highly desirable, for maximum versatility, that the valve be so designed that control of the cylinder can be effected through either manual control, electrical control, or by the transmission of air through pilot pressure lines which connect with the valve. In some instances it may be preferable that motion of the cylinder in a first direction be initiated by one method of actuation while motion in the return direction is controlled by a second method.

Accordingly the present invention provides a compact pneumatic cylinder having a control valve which is unitary therewith and which may be readily adapted for any of various modes of control with respect to motion in one or both directions.

It is thus an object of this invention to provide a pneumatic cylinder having a control mechanism formed integrally therewith.

It is an object of the invention to provide a pneumatic drive cylinder and control valve unitary therewith which apparatus is extremely compact and light weight.

It is a further object of this invention to provide a pneumatic cylinder which may be installed and moved with minimum effort.

Still another object of the present invention is to provide an air-driven cylinder requiring a minimum of external high pressure piping.

It is an object of this invention to provide a pneumatic cylinder having a built-in control valve the mode of actuation of which valve may be readily varied between electrical control, pilot pressure control, and manual manipulation.

It is another object of the invention to provide a pneumatic drive cylinder having a control valve forming an integral element thereof which cylinder may be readily adapted to extend by means of a first mode of actuation and to retract by means of a second and differing mode of actuation.

The invention possesses other objects and features of advantage, some of which, with the foregoing, will be set forth in the following description of the preferred form of the invention which is illustrated in the drawings accompanying and forming part of the specification. It is to be understood however, that variations in the showing made by the said drawings and description may be adopted within the scope of the invention as set forth in the claims.

Figure 1:
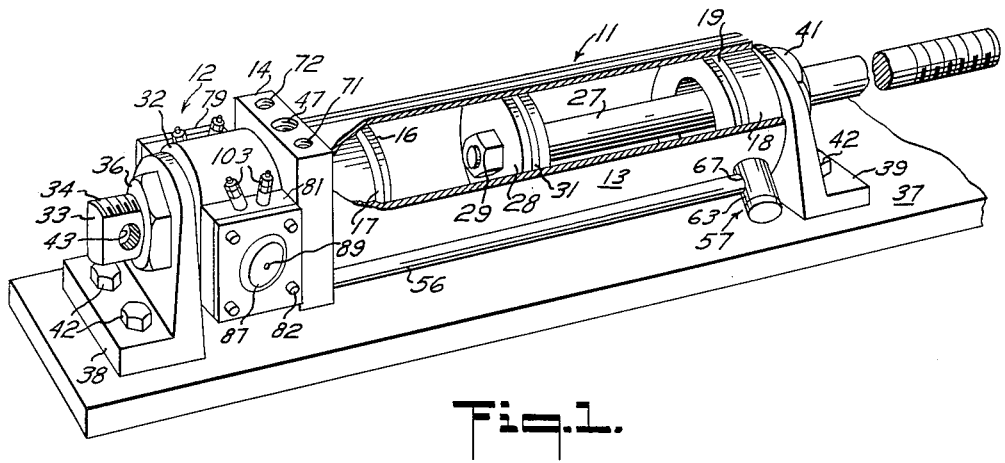
Figure 1 is a perspective view of a pneumatic cylinder with built-in control provision and with portions of the cylinder broken away to illustrate interior components thereof.

Referring now to the drawing and more particularly to Figure 1 there is shown a pneumatic drive assembly comprised of a drive cylinder section 11 and a control valve section 12 which is secured directly against the rearward end of the cylinder section and which forms a unitary mechanism therewith.

Considering first the detailed structure of the cylinder section 11, there is shown a cylinder casing or barrel 13 which has a length somewhat greater than the desired stroke. The rearward end of barrel 13 is closed by a head member which is comprised of a rectangular plate 14 which is disposed against the end of the barrel and centered thereon, the plate being of substantial thickness to provide for internal air passages as will hereinafter be described. A cylindrical projection 16 is formed on the forward face of plate 14 which projection extends a short distance into the barrel 13 and which is provided with a circumferential groove containing an O-ring 17 to seal the juncture between the barrel and the head.

Figure 2:
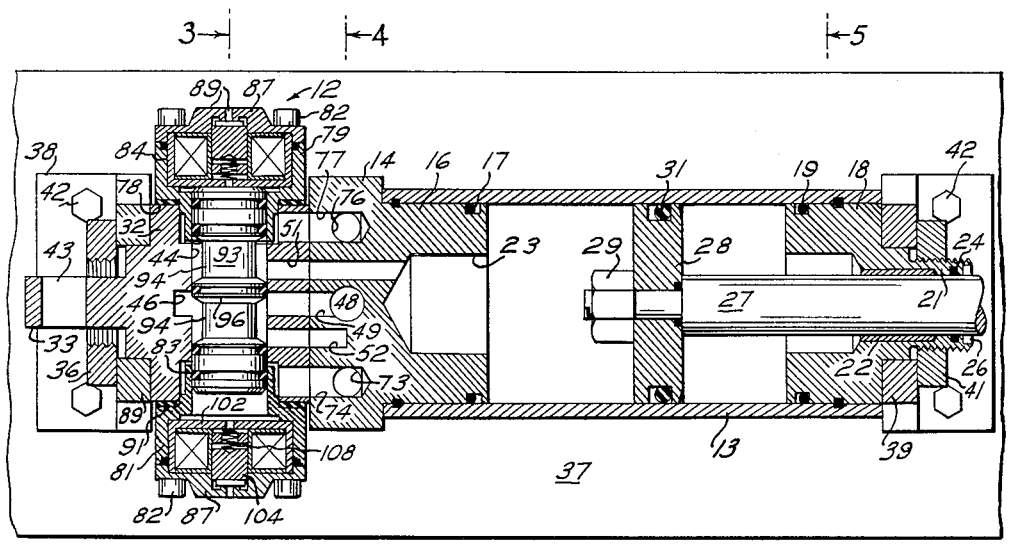
Figure 2 is a horizontal section view of the cylinder of Figure 1.

An annular closure and drive rod guide 18 is secured coaxially within the forward end of barrel 13 which closure is also provided with a circumferential groove mounting an O-ring 19. As best shown in Figure 2, the guide 18 is provided with a central tubulation 21 extending a short distance rearwardly from the barrel, the tubulation being externally threaded and being a continuation of a bore 22 which extends along the axis of guide 18 into the barrel. To provide for the installation of end of stroke cushions, which are optional and the design of which is well understood within the art, the inner portion of bore 22 may, if desired, be made of greater diameter than the forward portion and a well 23 of similar diameter may be provided in the forward end of the projection 16. To provide a seal between the guide 18 and a drive rod, an O-ring 24 is mounted in a circular groove inside the tubulation 21 and a second more forward groove is provided therein to mount an annular drive rod scraper 26 for preventing the entry of foreign material into the barrel.

With reference again to Figure 1, the drive rod or shaft 27 is slidably disposed along the axis of barrel 13 and extends through the bore 22 of guide 18. A circular piston 28 is secured to the end of rod 27 within the barrel 13 by means of a nut 29, the piston being coaxial with the rod and being provided with a circumferential groove in which an O-ring 31 is fitted to prevent the passage of air around the piston. The forward end of rod 27 is here shown externally threaded for connection to an external load which is to be driven, it being understood that other modes of connection with the mechanism to be driven are possible.

The foregoing structure constitutes a cylinder suitable for reciprocating any specified mechanism by means of the admission of high pressure air to a first end of barrel 13 and alternately to the opposite end thereof. Control of the switching of air between ends of the barrel 13 is the function of the valve section 12, the valving mechanism being contained in a valve housing 32 of generally cylindrical form which housing is secured against the rearward face of plate 14 in coaxial relationship to the barrel. Considering first, however, the means of mounting the cylinder, a projection 33 extends a short distance rearwardly from the valve housing 32 along the axis thereof, such projection being of substantially rectangular cross-section except that two opposing lateral surfaces 34 are made slightly convex and are externally threaded in order that a nut 36 may be engaged thereon. To secure the cylinder to a stationary surface 37, an angled bracket is used at each end of the cylinder, a first such bracket 38 being inserted over projection 33 and secured against the rearward face of valve housing 32 by means of nut 36, and a second such bracket 39 being inserted over the tubulation of guide 18 and secured thereagainst by a second nut 41. The bases of brackets 38 and 39 are secured to the surface 37 by means such as bolts 42. It will be found to be a particularly advantageous feature of the valve in head construction that the entire cylinder may be conveniently rotated about its axis by loosening the nuts 36 and 41 without requiring the use of unduly high brackets. The construction will be found, moreover, to be readily adapted to other forms of mounting. A transverse bore 43 is provided in the projection 33 whereby the assembly may be pivotably mounted at the rearward end and still other modes of mounting will suggest themselves.

Figure 3:
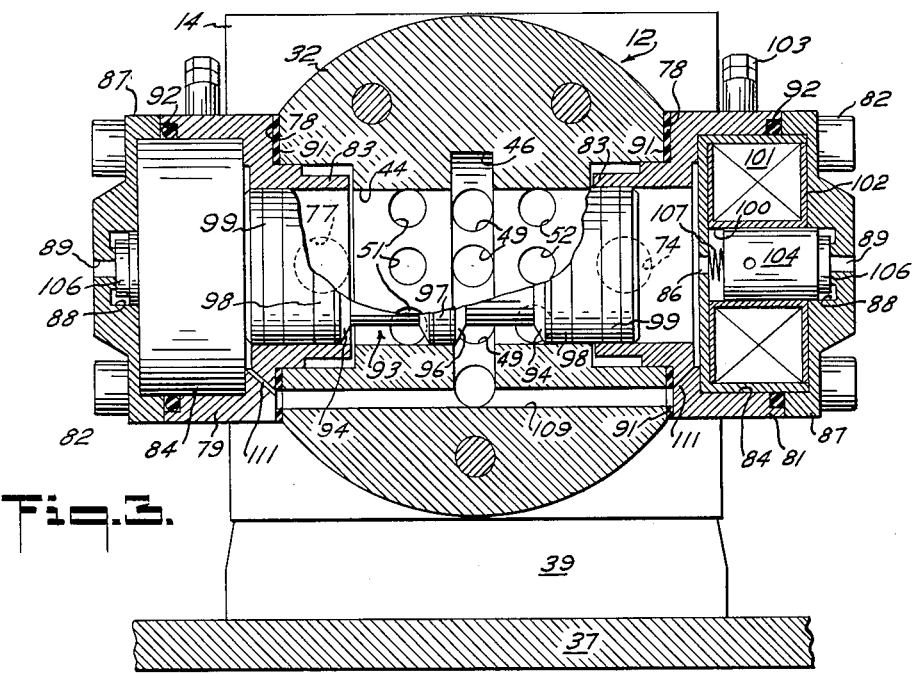
Figure 3 is a cross-section view taken along line 3—3 of Figure 2 and showing details of the valve structure of the cylinder.

Considering now the structure of the valve section 12 and with particular reference to Figures 2 and 3, there is shown a cylindrical valve chamber 44 formed within housing 32, the chamber being directed transversely with respect to the axis of barrel 13 and intersecting therewith. To receive secondary valve housings as will hereinafter be described, each extremity of the chamber 44 is of slightly enlarged diameter and to provide for an air inlet at the central area of the chamber a groove 46 is formed around the circumference of the chamber at the center transverse plane thereof.

Figure 4:
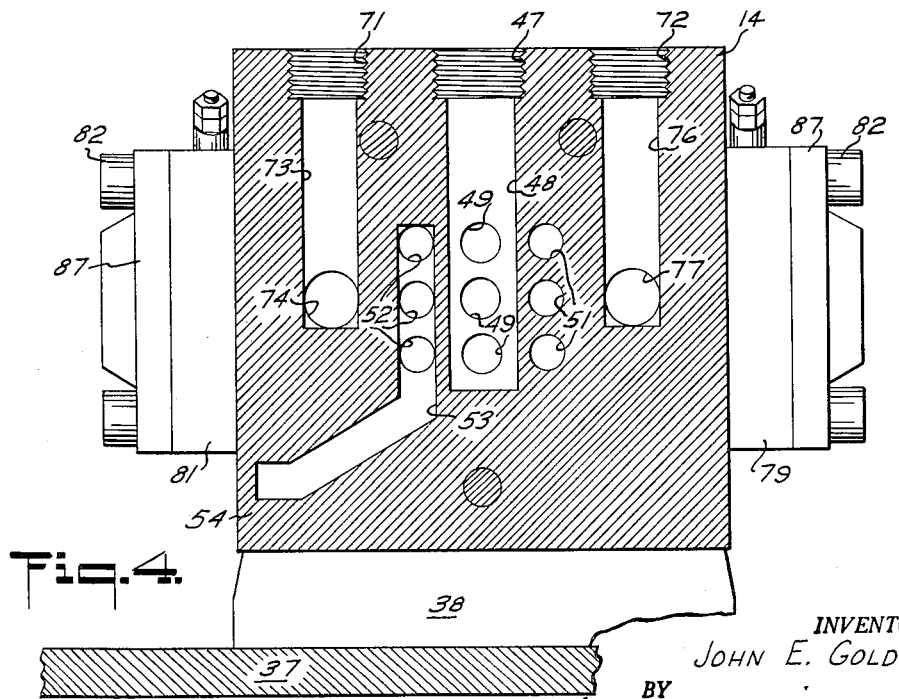
Figure 4 is a cross section view taken along line 4—4 of Figure 2 and showing further details of the cylinder valve structure.

With reference to Figure 4 in addition to Figures 2 and 3, an internally threaded air inlet port 47 is provided at the center of the upper edge of plate 14 into which port a fitting may be inserted to make connection with a supply of compressed air. A passage 48 extends downwardly from port 47 within the plate 14 and terminates somewhat below the center thereof, such passage serving to supply air to each of three spaced subsidiary passages 49 which lead rearwardly through plate 14 and housing 32 to communicate with groove 46 in the valve chamber 44.

Figure 5:
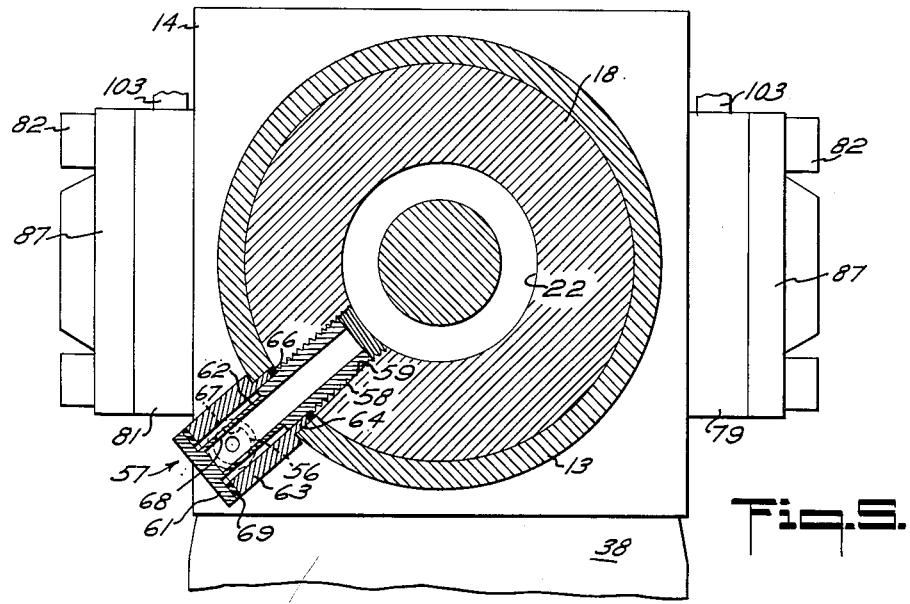
Figure 5 is a cross-section view taken along line 5—5 of Figure 2 and showing the air flow port at the forward end of the cylinder.

Inasmuch as air entering the chamber 44 through the above described passages is to be directed to a selected end of the barrel 13, two sets of air outlet passages communicate with the chamber, a first set comprised of three passages 51 being connected with the chamber on a first side of inlet passages 49 and a second set of three passages 52 entering the chamber an equal distance on the opposite side of inlets 49. Each of the passages 51 and 52 extend forwardly from chamber 44 through housing 32 to plate 14. Passages 51 continue through the plate 14 and associated projection 16 and communicate with the rearward end of barrel 13 through well 23. Passages 52 terminate at the forward surface of the valve housing 32 and communicate with a vertical passage 53 therein which passage 53 is angled at the lower portion and terminates near a corner 54 is the plate 14. As illustrated in Figures 1 and 5, air from passage 53 is carried to the forward end of barrel 13 by means of a transfer tube 56 which tube is secured at one end to corner 54 of plate 14, and communicates with passage 53 therein, and which extends forwardly parallel to barrel 13.

At the forward end of tube 56, a fitting 57 is provided which fitting connects with the forward end of barrel 13. As shown in Figure 5 in particular, fitting 57 comprises an externally threaded sleeve 58 which is entered in and engaged with a threaded bore 59 leading radially from bore 22 of guide 18 to the exterior surface of the barrel 13. The outer portion of sleeve 58 is of reduced diameter and a flange 61 is provided at the end thereof thus forming a groove 62 around the end of the sleeve. An outer sleeve 63 of slightly greater diameter is disposed coaxially around the outer end of sleeve 58, over groove 62 and extends between flange 61 and the outer surface of barrel 13, a reduced end portion 64 of sleeve 63 being entered in an enlarged bore provided in barrel 13 and bearing against an O-ring 66 therein. The forward end of transfer tube 56 enters an opening 67 in the outer sleeve 63 and openings 68 in sleeve 58 transmit air into the interior bore thereof. A gasket 69 is disposed between flange 61 and the adjacent end of outer sleeve 63 to seal the fitting against leakage.

Referring now to Figures 2 and 4 in particular, provision must be made for venting the end of barrel 13 which is opposite the end receiving air. Accordingly a pair of exhaust ports 71 and 72 are situated on the upper edge of plate 14 one on each side of the inlet port 47, such ports being preferably internally threaded in order that exhaust rate control valves may be added if desired. Within plate 14, a passage 73 extends downwardly from exhaust port 71 and connects with a passage 74 extending rearwardly through housing 32 and connecting with a first of the enlarged end sections of valve chamber 44. Similarly a passage 76 extends downwardly from port 72 and connects with a passage 77 extending rearwardly to connect with the opposite enlarged end section of the valve chamber 44.

Referring now to Figures 2 and 3, the lateral portions of valve housing 32 are truncated to form a flat shoulder 78 at each side thereof against each of which shoulders a rectangular secondary valve housing 79 and 81 are secured each by means of four mutually equidistant bolts 82, the housings being centered with respect to valve chamber 44. Each such housing 79 and 81 is provided with a tubulation 83 which projects into the adjacent enlarged end section of valve chamber 44, the tubulation having a reduced diameter with respect to the end section and being of slightly lesser length to avoid blocking the air exhaust passages. Each such tubulation 83 has an internal diameter equal to that of the central section of the valve chamber 44 so that such tubulations effectively form a continuation of the chamber. A circular well 84 is formed within each housing 79 and 81 which well opens at the lateral face of the housing and which is communicated with the adjacent tubulation 83 by means of a small central aperture 86. A rectangular cover plate 87 is disposed against the outer surface of each housing 79 and 81 and is secured thereto by the bolts 82 which hold the housings to the valve housing 32. A well 88 is formed in the center of the inner face of each cover plate 87 and a small vent aperture 89 is provided at the center of each cover plate which aperture connects with the well therein. To prevent leakage at the secondary valve housings, a gasket 91 is provided between each such housing and the valve housing 32 and an O-ring 92 is disposed between each cover plate 87 and the adjacent housing.

To provide for the switching of air from the inlet at groove 46 to a selected one of the outlets at passages 51 and 52, and to simultaneously vent one end of the cylinder, a cylindrical valve member 93 is disposed coaxially within valve chamber 44. Valve member 93 has an axial length less than the length of the valve chamber 44, including tubulations 83 of the secondary valve housings, by an amount slightly in excess of the width of groove 46. A pair of circumferential grooves 94 are formed on the valve member 93 one on each side of the central section 96 thereof, each such groove having a width slightly greater than the spacing of outlets 51 and 52 from groove 46. Thus the valve member 93 may move longitudinally within the valve chamber 44 to each of two extreme positions at one of which the inlet groove 46 is communicated with outlets 51 and at the other of which the groove is communicated with outlet 52. To prevent air leakage between the grooves 94, an O-ring 97 is disposed in a circumferential groove at the central section 96 of the valve member 93.

Provided exhaust outlets 74 and 77 are spaced from passages 51 and 52 a distance not exceeding the width of grooves 46, movement of the valve member 93 to either of the indicated extreme positions acts also to vent the end of the cylinder which is not receiving air. To prevent leakage of air past the extremities of the valve member 93 at either position thereof, a pair of spaced apart O-rings 98 and 99 are mounted in circumferential grooves at each end of the member.

Considering now the means by which the movement of valve member 93 between the two positions thereof is effected and controlled, a solenoid coil 101, mounted in an annular case 102, is disposed coaxially in each well 84 of the secondary valve housings 79 and 81, the coils having an axial passage 100 continuous with cover plate wells 88. To provide for electrical connection to the solenoid coils, a pair of terminal posts 103 are mounted on the upper surface of each secondary valve housing 79 and 81. A cylindrical core 104, formed of magnetic material, is disposed coaxially within each passage 100 one end of the core extending within cover plate well 88 and having a resilient disk 106 secured to the end thereof to form a valve element for vent aperture 89. A small compression spring 107 extends between an axial well 108 in the inner end of each core 104 and the adjacent bases of wells 84 to hold the disks 106 against the vent apertures 89 so that such apertures are normally closed except at such times as the corresponding solenoid 101 is energized.

The movement of valve member 93 is effected by venting an appropriate end of valve chamber 44, by means of the above described solenoid controlled secondary valves, while providing an elevated pressure to the opposite end of the chamber. To supply compressed air to the ends of the chamber 44 for this purpose, an air passage 109 extends transversely across the valve housing 32 beneath and parallel to valve chamber 44, such passage opening at each shoulder 78 beneath the adjacent secondary valve housing. For receiving air, passage 109 is communicated at the center with groove 46 and to supply air to the ends of the valve chamber 44, a small passage 111 extends through the base of each secondary valve housing 79 and 81 to connect the passage 109 with each tubulation 83. Thus with both solenoid valves closed, full air pressure is present at each end of the valve member 93.

Figure 6:
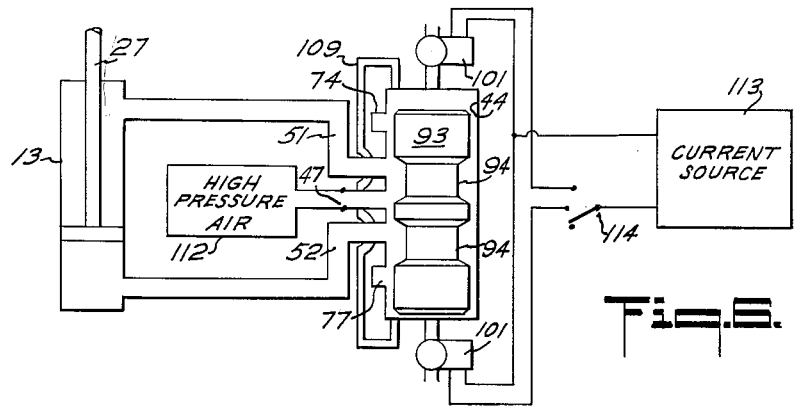
Figure 6 is a diagram showing the air passages within the cylinder in schematic form and showing external connections to the cylinder.

The operation of the cylinder may be best summarized by reference to Figure 6 in which the elements thereof are shown schematically. A source of compressed air 112 is connected with inlet port 47 leading to the center of valve chamber 44. An electrical current source 113 is provided with a switch 114 for selectively energizing either one of the secondary valve controlling solenoids 101 at the ends of the valve chamber. Inasmuch as the passage 109 supplies inlet pressure to each end of the valve chamber, opening of one of the solenoid controlled secondary valves acts to establish a pressure differential between ends of the chamber thereby causing the valve member 93 to move to the vented end. Such movement of the valve member 93 acts to connect the air inlet port 47 with one of the outlets 51 and 52, leading to one end of the barrel 13, through a valve member groove 94. Such movement also acts to vent the opposite end of barrel 13 through the second groove 94 and the corresponding one of the exhaust outlets 74 and 77. Thus by manipulation of switch 114, which may be either manually controlled or automatic, the drive rod 27 may be caused to move in either direction and may be made to drive any desired external load.

Figure 7:
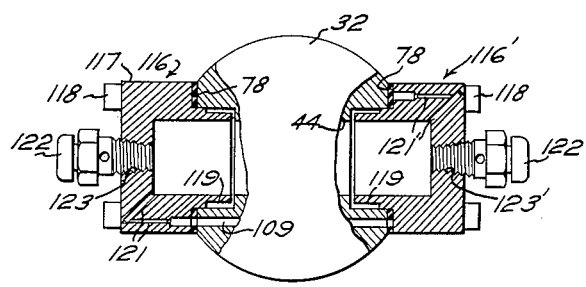
Figure 7 is a cross section view corresponding to Figure 3 and showing readily effected modifications whereby two differing methods may be used to actuate the cylinder in addition to the method shown in Figure 3.

It is a highly advantageous property of the invention that the mechanism may be easily adapted for modes of control other than the electrical system described above. Referring now to Figure 7, provision for two different modes of control are illustrated, one at each side of the valve chamber 44. Considering first provision for manual control of the contraction stroke, a modified secondary valve housing 116 is shown at one side of the housing 32, the modified valve housing being a rectangular plate 117 secured to shoulder 78 by four bolts 118 in the manner described previously. Plate 117 is provided with a tubulation 119 entering the end of the valve chamber and which is similar to the tubulation 83 as previously described. An angled passage 121 is provided in plate 117 which connects passage 109 with the tubulation 119 thereby providing inlet air pressure to the end of valve chamber 44. To provide for manual venting of the end of the valve chamber 44, a thumb operated normally closed valve 122 is secured in a threaded opening 123 at the center of plate 117. Depression of the valve 122 will thus cause the cylinder to be actuated in a manner similar to that previously described in conjunction with solenoid control of the mechanism.

At the opposite end of the valve chamber 44 in Figure 7, provision for control by still another means is shown. Such means uses the same form of modified secondary valve housing 116 is described above, the housing 116′ having been rotated one hundred and eighty degrees about the axis thereof and resecured to the housing 32 which adaptation is permitted by the equidistant spacing of bolts 118. Such rotation of the housing 116′ disconnects the internal high pressure air supply passage 109 from the end of the valve chamber 44 as the passage 121′ is now at the top of the housing. The threaded opening 123′, which previously served to mount the manual valve, may now be used to connect with a source of externally controlled pressure which is to operate the mechanism.

It should be understood that the three described modes of control may be employed together as illustrated in Figure 7, one such method being used for a first end of the valve chamber and another of the methods being used for the opposite end.

What is claimed is:

1. In a pneumatic drive cylinder, the combination comprising a cylindrical air-tight casing having an axial opening at a first end and having a valve housing disposed at the opposite end which housing is transpierced by a cylindrical chamber directed transversely with respect to the axis of said casing, said housing having an air inlet communicating with the central region of said chamber and having a pair of air outlets spaced one on each side of said inlet and each communicated with a separate end of said casing, said housing further having a pair of air vents spaced one on each side of said outlets and further having a pair of selectively closable passages one connecting each end of said chamber with said air inlet, a valve cylinder disposed coaxially in said chamber for longitudinal movement between two positions therein, said cylinder having a pair of circumferential grooves spaced one on each side of the center thereof which grooves have a width at least equal to the spacing between said inlet and said outlets and said outlets and said vents whereby movement of said cylinder between said two positions alternately connects said inlet with each of said outlets and simultaneously vents the outlet which is disconnected from said inlet, a pair of closure plates each attached to a separate end of said housing and sealing said chamber therein and each having an air outlet communicating with the adjacent end of said chamber, means for controlling air flow through said outlets of said plates whereby a pressure differential may be established between ends of said chamber to move said cylinder between said two positions, a piston disposed within said casing which piston is movable in response to differences of pressure between the ends of said casing, and a drive rod projecting through said axial opening in said casing and being secured to said piston for transferring motion thereof to an external load.

2. A pneumatic drive cylinder substantially as described in claim 1 wherein said closure plate at at least one end of said housing is attachable thereto in either of two positions at one of which positions said plate acts to close said passage connecting the end of said chamber with said air inlet whereby an external variable pressure source may be connected to said end of said chamber to control movement of said cylinder therein.

3. In a fluid pressure operated drive cylinder, the combination comprising a valve housing having a cylindrical chamber formed therein which chamber is provided with a high pressure fluid inlet and at least one outlet communicating with an end of said drive cylinder, said housing further having a pair of fluid passages separately connecting said inlet with each end of said chamber, a circumferentially grooved valve spool slidably disposed in said chamber to connect said inlet with said outlet at a first position and to disconnect said inlet from said outlet at a second position, said valve spool being slidable between said positions in said chamber in response to fluid pressure differences at the ends thereof, and means for selectively blocking said fluid passage at at least one end of said chamber whereby the fluid pressure at said end of said chamber may optionally be controlled by an external pressure source.

4. In a pneumatic drive cylinder, the combination comprising a valve housing having a cylindrical chamber formed therein, said housing having a compressed air inlet and a pair of spaced apart outlets one connected with each end of said drive cylinder, said housing further having a pair of air passages each connecting said inlet with an end of said chamber, a circumferentially grooved valve spool slidably disposed in said chamber between two positions therein for alternately connecting said inlet with each of said outlets through said circumferential groove thereon, said spool being movable between said positions in response to pressure differences at the ends of said chamber, and an end member for at least one end of said housing which end member is attachable thereon in two positons, said member having an element blocking said air passage at said end of said chamber at a first position and leaving said passage unobstructed at the second position, said end member having provision for selectively connecting an external compressed air source to said end of said chamber.

5. In a control valve for selectively directing compressed air to either end of a pneumatic drive cylinder, the combination comprising a valve housing transpierced by a cylindrical chamber and having an air inlet at the central region thereof and a pair of air outlets spaced one on each side of said inlet for connection with opposite ends of said drive cylinder, said housing having an air passage extending substantially parallel with said chamber and connecting with said air inlet which passage opens at each side of said housing, a slidable valve spool disposed in said chamber and movable to two positions therein in response to pressure differences between ends of said chamber, said spool having a pair of spaced apart passages for connecting said inlet with a separate one of said outlets at each of said positions, and a pair of end closures attachable against said sides of said housing, each said end closure being attachable in a first position and in a second position at which said closure is rotated about the axis of said chamber with respect to said first position, each said closure having an air channel communicating said air passage of said housing with the adjacent end of said chamber at the first position of said closure.

6. In a pneumatic drive cylinder, the combination comprising a valve housing transpierced by bore forming a valve chamber in said housing, said housing having a compressed air inlet communicating with said bore and having at least one air outlet connecting said bore with an end of said cylinder, said housing further having additional air passages connecting said compressed air inlet with each end region of said bore, a grooved valve spool slidingly disposed in said bore to connect said inlet with said outlet at a first position and to disconnect said inlet from said outlet at a second position, said spool being slidable between said first and second positions in response to fluid pressure differences between the ends of said bore, a side member secured against each side of said housing to close the ends of said bore, at least one of said side members having a cylindrical chamber formed therein which chamber is continuous with said bore of said housing and which chamber is vented through an aperture in the wall of said side member opposite said bore, an annular solenoid coil disposed coaxially within said chamber, a slidable magnetic core element disposed coaxially within said coil and having an element in register with said aperture in the wall of said side member for closing said aperture, and spring means urging said core against said aperture to close the end of said bore except upon energization of said coil.

7. A pneumatic drive cylinder substantially as described in claim 6 and wherein said chamber of said side member is coaxial with said bore of said housing, said solenoid coil conforming in diameter and length to said chamber to substantially fill said chamber, said core element being cylindrical and substantially conforming in diameter to the internal diameter of said coil, whereby the air space at the end of said bore is minimal.

References Cited in the file of this patent

UNITED STATES PATENTS

| 2,729,242 | Olson | Jan. 3, 1956 |
| 2,777,427 | Nichols | Jan. 15, 1957 |
| 2,808,811 | McLaughlin | Oct. 8, 1957 |